(12) United States Patent
Martell et al.

(10) Patent No.: US 10,044,655 B2
(45) Date of Patent: Aug. 7, 2018

(54) MANAGING DISTRIBUTION OF MEDIA CONTENT

(71) Applicant: Microsoft Technology Licensing, LLC, Redmond, WA (US)

(72) Inventors: Craig Martell, San Juan Bautista, CA (US); Daniel Wong, San Jose, CA (US); Ganesan Venkatasubramanian, Karnataka (IN); Lifeng Sang, Sunnyvale, CA (US); Maulin Patel, Gujarat (IN); Mohammad Shafkat Amin, Cupertino, CA (US); Shivakumar Edayathumangalam Raman, Karnataka (IN); Siddharth Agarwal, Sunnyvale, CA (US); Vicente Barbosa da Silveira, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 292 days.

(21) Appl. No.: 14/926,651

(22) Filed: Oct. 29, 2015

(65) Prior Publication Data
US 2016/0323221 A1 Nov. 3, 2016

Related U.S. Application Data

(60) Provisional application No. 62/155,374, filed on Apr. 30, 2015.

(51) Int. Cl.
*G06F 15/16* (2006.01)
*H04L 12/58* (2006.01)

(52) U.S. Cl.
CPC .............. *H04L 51/12* (2013.01); *H04L 51/10* (2013.01); *H04L 51/32* (2013.01)

(58) Field of Classification Search
CPC .......... H04L 51/10–51/18; H04L 51/22; H04L 51/32; H04L 29/06027; H04L 29/06176; H04L 51/08702
See application file for complete search history.

*Primary Examiner* — Brendan Higa
(74) *Attorney, Agent, or Firm* — Schwegman Lundberg & Woessner, P.A.

(57) ABSTRACT

This disclosure relates to systems and methods that include receiving media content from a content submitter, classifying the media content by initiating one of synchronous classification and asynchronous classification based on a type of the media content, generating a media content certificate based on the media type, the certificate including results of the classification, storing the media content certificate with the media content, and filtering the media content based on at least one of an identity of the content submitter, the results of the classification, and the media content including malicious content.

20 Claims, 11 Drawing Sheets

MANAGING DISTRIBUTION OF MEDIA CONTENT

RELATED APPLICATIONS

This application claims the benefit of priority to U.S. Provisional Patent Application Ser. No. 62/155,374, filed Apr. 30, 2015, which is incorporated herein by reference in its entirety.

TECHNICAL FIELD

The subject matter disclosed herein generally relates to data processing and more particularly, to managing distribution of media content.

BACKGROUND

Providers and administrators of an online social networking service distribute content in a variety of different ways. Members of the online social networking service submit media content and request media content from other members via the online social networking service.

However, in some scenarios, submitted media content may be inappropriate for other members of the online social networking service, may be spam, may include malicious content, or may be submitted for other nefarious purposes. Furthermore, what is inappropriate for some members of the online social networking service may be acceptable for other members. Managing distribution of media content to such a wide variety of members poses many technical challenges because what is appropriate varies with each media content destination.

In another scenario, classifying media content may require significant computing resources which may delay classification of the submitted media content. This may also cause an online social networking service to either allow access to the media content without classification, or not make the media content visible to members of the online social networking service until the classification is complete.

BRIEF DESCRIPTION OF THE DRAWINGS

Some embodiments are illustrated by way of example and not limitation in the figures of the accompanying drawings.

DETAILED DESCRIPTION

Figure 1:
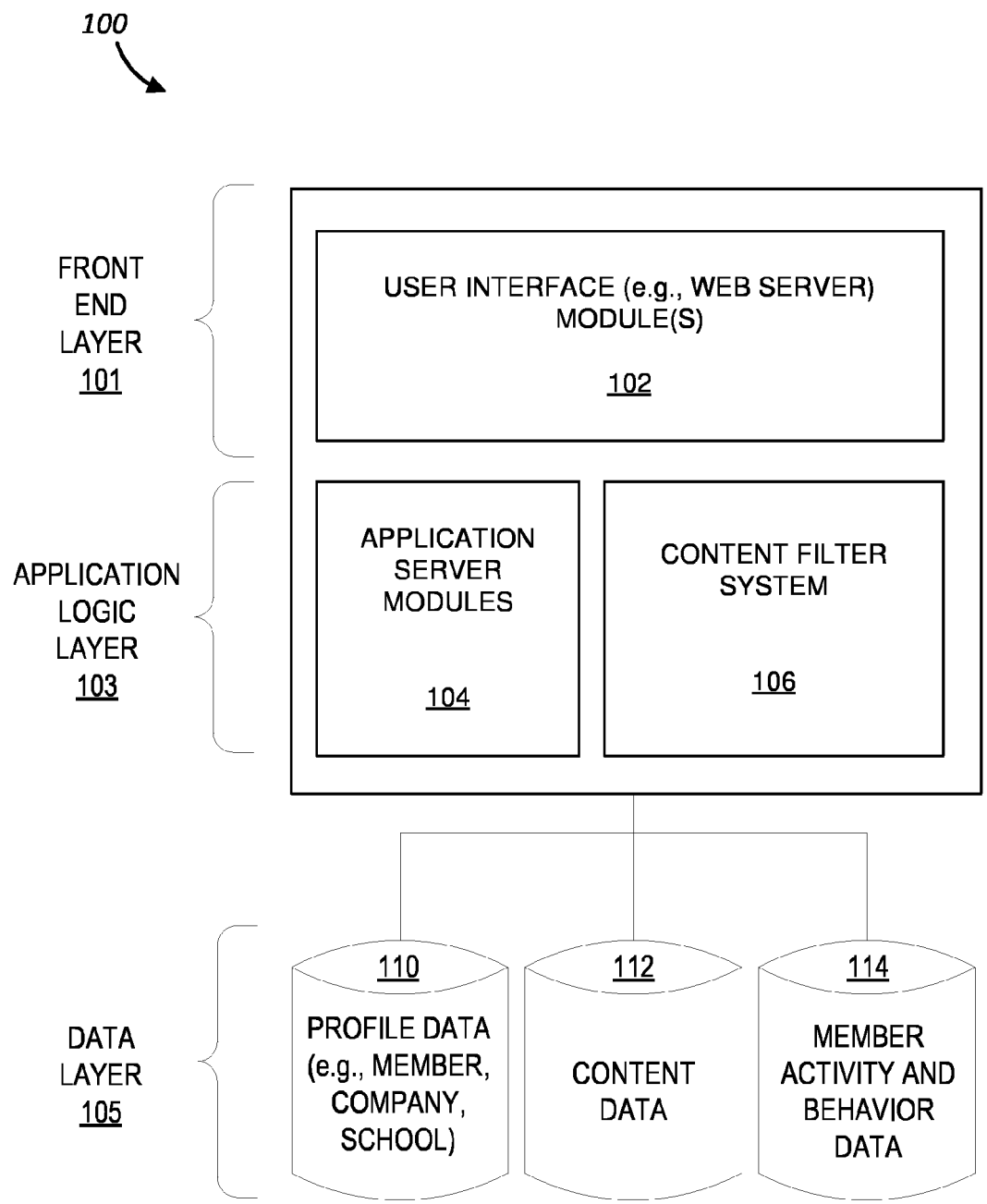
FIG. 1 is a block diagram illustrating various components or functional modules of an online social networking service, in an example embodiment.

The description that follows includes systems, methods, techniques, instruction sequences, and computing machine program products that embody illustrative embodiments of the invention described in the present disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Example methods and systems are directed to managing distribution of media content. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Techniques for managing distribution of media content have been developed that may provide for classifying and filtering media content at an online social networking service. Thus, in one example, a member submits media content for inclusion in the online social networking service, and a system classifies the media content. The system then generates a classification certificate that encapsulates results of the classification.

Then, in response to a member of the online social networking service requesting the media content, the system filters the media content based on the various parameters included in the classification certificate. In certain embodiments, media content includes, but is not limited to, text, images, audio, video, or other media content as one skilled in the art may appreciate.

Accordingly, the system classifies and filters media content for many different members of the online social networking service with a wide variety of filtering needs and/or preferences. An administrative user for a domain of members of the online social networking service may submit a set of filtering rules to the system applicable to the domain of members, and the system filters requested media content using the filtering rules. In this way, the system supports different standards for media content and applies varying sets of filtering rules to different domains of members of the online social networking service. This allows an administrative user for the domain of members to uniquely filter media content from the online social networking service.

In one example embodiment, media content filtering includes modifying or blocking media content based, at least in part, on properties of the media content, properties of a submitter for the media content, or other properties. Filtering media content in this way provides for decreased existence of malicious media content, illegal media content, inappropriate media content, or other content that may be inconsistent with a purpose of the online social networking service 100. In certain embodiments, the content filtering system (e.g., FIG. 1: 106) filters the media content at ingestion time (e.g., when the media content is received from a member) and/or at retrieval time (e.g., when the media content is requested by a member).

In one embodiment, the content filtering system 106 filters media content based on regulatory requirements. For example, a country's government may disallow media content that includes certain keywords, such as, but not limited to, words that criticize government personnel, or other entities. In another example, media content that is considered child pornography may be illegal in a certain county, and the content filtering system 106 may filter the media content based on the illegality of the media content.

In another example embodiment, a member's terms of service associated with using the online social networking service 100 may describe disallowed media content and the content filtering system 106 may filter media content based on the member's terms of service.

In another example embodiment, the content filtering system 106 filters media content that is inappropriate for a member that requested the media content. For example, the content filtering system 106 may apply a rating to the media content consistent with a standard of ratings based on age. In response to a member's age not satisfying requirements to view the media content, the content filtering system 106 filters the media content for the underage member. In one specific example, the content filtering system 106 filters media content according to the Entertainment Software Rating Board (ESRB). Of course, other standard rating systems may be used and this disclosure is not limited in this regard.

In another example embodiment, the content filtering system 106 filters media content based on privacy or security. For example, text messages between two members of the online social networking service 100 may be filtered from other members so that the other members cannot access the private messages. In another example, a submitter of media content may indicate that the media content is to be protected based on a government classification level (e.g., confidential, secret, top secret, or the like). In response to a member requesting the media content and the member not satisfying requirements of the classification level, the content filtering system 106 filters the media content.

According to certain embodiments, the content filtering system 106 receives media filtering rules from different domains, and filters the media content according to the received filtering rules. Therefore, although different domains may have different media content filtering rules, the content filtering system 106 effectively filters media content to a wide variety of different destinations with different filtering rules for each destination.

FIG. 1 is a block diagram illustrating various components or functional modules of an online social networking system 100, consistent with some examples. The online social networking service 100 may be utilized to manage distribution of media content. In one example, the online social networking service 100 includes the content filtering system 106 that performs the various media content classification and filtering operations described herein.

A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. In another example, the front end layer 101 receives requests from an application executing via a member's mobile computing device. In one example, a member submits media content for inclusion in the online social networking service 100, or requests media content from the online social networking service 100.

An application logic layer 103 includes various application server modules 104, which, in conjunction with the user interface module(s) 102, may generate various user interfaces (e.g., web pages, applications, etc.) with data retrieved from various data sources in a data layer 105.

In some examples, individual application server modules 104 may be used to implement the functionality associated with various services and features of the online social networking service. For instance, the ability of an organization to establish a presence in the social graph of the online social networking service 100, including the ability to establish a customized web page on behalf of an organization, and to publish messages or status updates on behalf of an organization, may be services implemented in independent application server modules 104. Similarly, a variety of other applications or services that are made available to members of the online social networking service may be embodied in their own application server modules 104. Alternatively, various applications may be embodied in a single application server module 104.

In some examples, the online social networking service 100 includes the content filtering system 106, such as may be utilized to receive media content, such as electronic messages, posts, links, images, videos, and the like, and publish the content to the online social networking service 100 and/or other members of the online social networking service 100 that request the media content.

As illustrated, the data layer 105 includes, but is not necessarily limited to, several databases 110, 112, 114, such as a database 110 for storing profile data, including both member profile data as well as profile data for various organizations. Consistent with some examples, when a person initially registers to become a member of the online social networking service 100, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the online social networking service 100, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the online social networking service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within a social graph database.

The online social networking service 100 may provide a broad range of other applications and services that allow members the opportunity to share and receive information, often customized to the interests of the member. For example, with some examples, the online social networking service 100 may include a photo sharing application that allows members to upload and share photos with other members. With some examples, members may be able to self-organize into groups, or interest groups, organized around a subject matter or topic of interest. With some examples, the online social networking service 100 may host various job listings providing details of job openings with various organizations.

In other embodiments, the content filtering system 106 stores received media content in a media content storage database 112. The content filtering system 106 also stores a content certificate in the media content storage database 112. The media content certificate may be stored with the associated media content so that a requester of the media content also receives the associated media content certificate.

As members interact with the various applications, services and content made available via the online social networking service 100, information concerning content items interacted with, such as by viewing, playing, and the like, etc., may be monitored and information concerning the interaction may be stored, for example, as indicated in FIG. 1 by the database 114. Thus, previous interactions with a content item by various members of the online social networking service 100 may be stored and utilized in determining, among other factors, how various types of content items, such as organic content items and sponsored content items, result in differences in engagement levels with the content items by members of the online social networking service 100.

Although not shown, with some examples, the online social networking service 100 provides an application programming interface (API) module via which third-party applications can access various services and data provided by the online social networking service 100. For example, using an API, a third-party application may provide a user interface and logic that enables the member to submit and/or configure a set of rules used by the content filtering system 106 to filter media content. Such third-party applications may be browser-based applications, or may be operating system-specific. In particular, some third-party applications may reside and execute on one or more mobile devices (e.g., phone, or tablet computing devices) having a mobile operating system.

In another example embodiment, a media requester requests media content from the content filtering system 106. The content filtering system 106 sends the requested media content to the requester. In response to receiving a request from the request to block media content from the submitter, the filter module 290 blocks all media content originating from the submitter. In another embodiment, in response to a threshold number of members of the online social networking service 100 requesting to block the submitter, all media from the submitter is filtered by the filter module 290.

Figure 2:
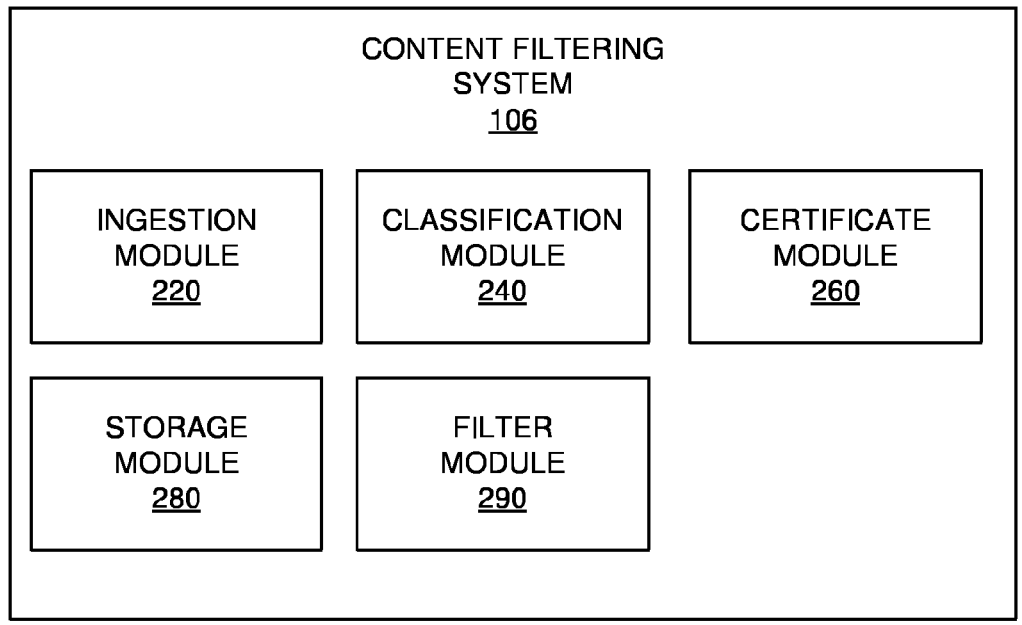
FIG. 2 is a schematic block diagram illustrating components of a content filtering system, according to one example embodiment.

FIG. 2 is a schematic block diagram illustrating components of a content filtering system 106, according to one example embodiment. The content filtering system 106, in one example embodiment, includes an ingestion module 220, a classification module 240, a certificate module 260, a storage module 280, and a filter module 290.

The ingestion module 220 may be configured to receive media content from a member of the online social networking service 100. The ingestion module 220 may receive media content in any way as one skilled in the art may appreciate. In one example, the ingestion module 220 receives media content from a content submitter over a network as will be further described in FIG. 3. In a specific example, the network is the Internet and the content submitter transmits media content to the ingestion module 220 over the Internet, for instance, using a client computing machine.

In another example embodiment, the ingestion module 220 receives media content by loading the media content from content server. In one example, the media content resides on a remote content server. In certain examples, the content includes files, documents, and other media forms. In response to receiving the link, the ingestion module 220 reads the media content from the remote content server. In another example embodiment, the link begins streaming of audio and/or video media content and the ingestion module 220 receives the media content. Of course, one skilled in the art may recognize many other ways in which media content may be received by the ingestion module 220 and this disclosure is not limited in this way.

In another example embodiment, the classification module 240 is configured to classify the media content. Classification of the media content includes generating a set of properties that describe the media content. The parameters may indicate a wide variety of properties, such as, but not limited to, whether the media content is spam, democratic propaganda, an advertisement, a job offer, a type of the media content, a source location for the media content, a time period for the media content, a media content rating, or other media content property as described herein.

In another example embodiment, a media content property includes the submitter for the media content. For example, where the media content submitter has been identified as a spammer, the classification module 240 classifies the media content as spam regardless of other properties of the media content. In another example embodiment, the classification module 240 determines one or more destinations where the media content is not allowed. For example, where democratic propaganda is not allowed in a specific country, the classification module 240 may classify the media content as not allowed in the specific country.

In another embodiment, the classification module 240 determines whether to initiate synchronous classification or asynchronous classification based, at least in part, on the type of media content being one of a set of predefined media types. In one specific example, the predefined media types for synchronous classification include text strings and binary values, and the predefined media types for asynchronous classification include images, video, and audio.

In another example embodiment, the classification module 240 considers a priority of the media content in determining whether to initiate synchronous or asynchronous classification. For example, the online social networking service 100 may assign a higher priority to a certain text field, such as a "Title" field. In response to receiving media content for the "Title" field, the classification module 240 initiates synchronous classification of the media content. For example, a priority threshold value may define whether synchronous classification and/or asynchronous classification is initiated by the classification module 240.

In one example, the media content type is text. Because text requires little processing to classify, the classification module 240 performs synchronous classification for the media content. Therefore, in a series of operations that receive, classify, and store the media content, the classification module 240 performs classification of the media content before other modules perform their respective functions. For example, the classification module 240 may classify the media content synchronously before the storage module 280 stores the media content. In certain examples, synchronous classification includes classifying the media content in a single process such that operations that occur after the synchronous classification wait for the synchronous classification to complete before beginning.

In another example, the media content is video. Because classifying a video may require significant processing (e.g., several hours), the classification module 240 may perform a cursory analysis of the video by classifying the video based on an author, title, length, video meta-data, or the like, and concurrently perform asynchronous classification of the media content. For example, the classification module 240 may initiate another process for comprehensive classification of the video, while the storage module 280 and other modules perform their respective functions. Thus, other modules do not need to wait for the classification module 240 to complete classification of the media content before storing the media content or providing the media content to other members of the online social networking service 100. In certain examples, the comprehensive classification determines whether the video is an advertisement, pornography, contains profanity, conforms to a level in a rating system, or includes other inappropriate content. After receiving results of the comprehensive classification process, the classification module 240 includes the results as additional properties of the media content.

In another example, the media content is a binary file that is a Portable Document Format (PDF) file as developed by Adobe Systems™. The classification module 240 reads the PDF file to determine whether the PDF file is text or image based. In response to the PDF file not including any imagery, the classification module 240 performs synchronous classification on the PDF file. In response to the PDF file including images and/or other embedded content, the classification module 240 initiates asynchronous classification on the PDF file.

In another example embodiment, the classification module 240 does not classify based on the identity of the content submitter while receiving the media content, but waits until the media content is received. In this example embodiment, the classification module 240 then classifies the media content after determining one or more parameters associated with the submitter of the media content. For example, before a submitter is classified as a spammer, the classification module 240 may receive media content from the submitter. The classification module 240 may classify the media content as described herein.

At a later time, the classification module 240 may determine that the member is a spammer based, at least in part, on other media content submitted to the online social networking service 100. In response to determining that the member is a spammer, the previously received media content may be identified as spam and included in a content certificate as described herein. In this example embodiment, the spammer believes the media content has been accepted by the online social networking service, when in fact, the media content has been identified as spam and will be filtered by the filter module 290.

In another example embodiment, the classification module 240 blocks received media content in response to the media content including a term that is not allowed at the online social networking service 100. In this example embodiment, the classification module 240 deletes the media content. In this example embodiment, other modules, such as the storage module 280 and the filter module 290 do not perform their respective functions on the received media content.

In one example embodiment, the certificate module 260 generates a media content certificate based on the media type and results of the classification. Therefore, the content certificate includes the various parameters that describe the media content. Furthermore, in response to asynchronous classification and receiving additional parameters from the classification module 240, the certificate module 260 includes the additional parameters in the content certificate for the media content. Accordingly, a requester of the media content receives both the media content and the associated content certificate. This facilitates the requester of the content to handle the media content based on the parameters in the certificate without viewing the requested media content.

In certain embodiments, the content certificate indicates at least one of a media content type such as, but not limited to, an occupational opportunity, a promotion, a subject matter, a predefined term, and malicious executable code. In other examples, the content certificate includes a media content rating, an indicator of spam, the identity of the media content submitter, and a rating for the media content submitter.

In another example embodiment, the content certificate identifies one or more locations where the media content is, or is not allowed. For example, where democratic propaganda is not allowed in a specific country and the media content includes democratic propaganda, the certificate module 260 stores an indicator indicating that the media content is not allowed in the specific country.

In another example embodiment, the content certificate includes indicators from one or more members of the online social networking service 100. For example, where a threshold number of members have identified the media content as an advertisement (even where the classification module 240 had not previously identified the media content as an advertisement), the certificate module 260 includes an indicator that the media content is an advertisement.

In another example embodiment, in response to a threshold number of members indicating one or more parameters that describe the media content, the certificate module 260 includes the additional parameter in the media content certificate. For example, where a threshold number of members is 20, in response to 20 or more members indicating that the received media content includes vulgar language, the certificate module 260 includes an indicator in the media content certificate that the media content includes vulgar language regardless of whether the classification module 240 included such an indicator.

In another example embodiment, the storage module 280 stores the media content certificate with the media content. In one example, the media content and the media content certificate are stored in a single file. For example, a hypertext markup language may encapsulate the media content certificate and the media content in a single file. Of course, other language and/or formats may be used and this disclosure is not limited in this regard. Accordingly, a media requester requests the encapsulated file and subsequently receives both the media content and the content certificate in a single file transfer operation. For example, a file server may store the encapsulated file and distribute the media and the content certificate without having to manage associations between multiple files.

In another example embodiment, the storage module 280 stores the media content certificate and the media content in a binary file according to a predetermined format. Of course, one skilled in the art may recognize a wide variety of different ways in which a media content certificate and the media content may be stored in a single file and this disclosure is meant to include all such ways.

In one example embodiment, the storage module 280 stores the media content certificate and the media content in different files, but at a similar location. The storage module 280 may store a databased record in a database that associates the media content file and the media content certificate file.

In one example embodiment, the filter module 290 filters the media content based on one or more parameters stored in the media content certificate. For example, in response to an indicator in the media content certificate indicating that the media content includes malicious executable code, the filter module 290 filters the media content. In one example embodiment, filtering the media content includes denying access to the media content for a member of the online social networking service 100. In another example, the filter module 290 refuses to transmit the media content to a requester for the media content.

In another example embodiment, the filter module 290 receives one or more filter rules from a foreign domain. A domain, as described herein, includes an array of devices that communicate via a common network. In one example, the domain is a local area network. In another example, the domain is a wide area network. In another example, a domain is a virtual domain without physical boundaries, but includes logical boundaries that define the virtual domain. In one example a set of Internet Protocol (IP) addresses form a domain.

In certain examples, the filter module 290 filters media content according to one or more filter rules received from the domain. In one example, a domain media controller communicates with the content filtering system 106 to submit media content, define filter rules, and request media content from the content filtering system 106. In one example embodiment, the filter module 290 communicates with the domain media controller according to a pre-defined communication protocol.

In one example embodiment, the filter module 290 filters media content according to an image filter rule. In one example, an image filter rule disallows pornographic imagery. In response to an image being identified by the classification module 240 as pornographic, the filter module 290 filters the image.

In another example, the filter module 290 filters media content according to a term filter rule. In one example, a term filter rule disallows a specific derogatory term. In response to submitted media content including the specific derogatory term, the filter module 290 filters the media content.

In another example, the filter module 290 filters media content according to a manual filter rule. A manual filter rule, in one example embodiment, includes a custom rule configured by an administrative user of the online social networking service 100. In one example, a manual filter rules includes a restriction based on any property of media content as one skilled in the art may appreciate. Certain examples include text media that includes certain word combinations, images that include certain colors, videos consistent with a certain topic, audio media that includes certain sounds, or any other properties of media content.

In another example embodiment, the filter module 290 filters media content according to a location. In one example, the classification module 240 includes the location of the submitter of the media content as one of the parameters and the certificate module 260 stores the location in the media content certificate. The filter module 290 may then filters the media based on the location of the submitter included in the content certificate. In one example, a filter rule for a media requester does not allow media content from the United States of America (USA). Thus, the classification module 240 determines the source location (the USA), the certificate module 260 includes the location (the USA) in the media content certificate, and the filter module 290 filters the media content requested by the media requester in response to the requested media originating in the USA.

In another example, a filter rule received from a domain media controller does not allow video content to be received. In response to a computing device from the domain requesting video content, the filter module 290 filters the video. In another example embodiment, the filter module 290 filters media content according to a ratings system as previously described.

In another embodiment, the filter module 290 filters media content according to a set of filter rules. In one example, the set of filter rules include any combination of rules described herein. In certain examples, the filter module 290 filters the media content in response to the classification module 240 identifying the media content as a solicitation of employment, a promotion, an event, an advertisement, or other, or the like.

In another example embodiment, the filter module 290 filters media content based on the identity of the submitter of the media content. In one example, a requester of media content blocked the submitter of media content. In response, the filter module 290 filters all media requested by the requester that originated from the blocked submitter. In another example embodiment, the classification module 240 identifies a submitter of media content as a spammer. In response, the filter module 290 filters media content submitted to the online social networking service 100 by the spammer.

In another example embodiment, the spammer had previously submitted media content that was not identified as spam. In response to the ingestion module 220 identifying subsequent media content as spam, the filter module 290 may also filter previously submitted media content from the spammer.

Figure 3:
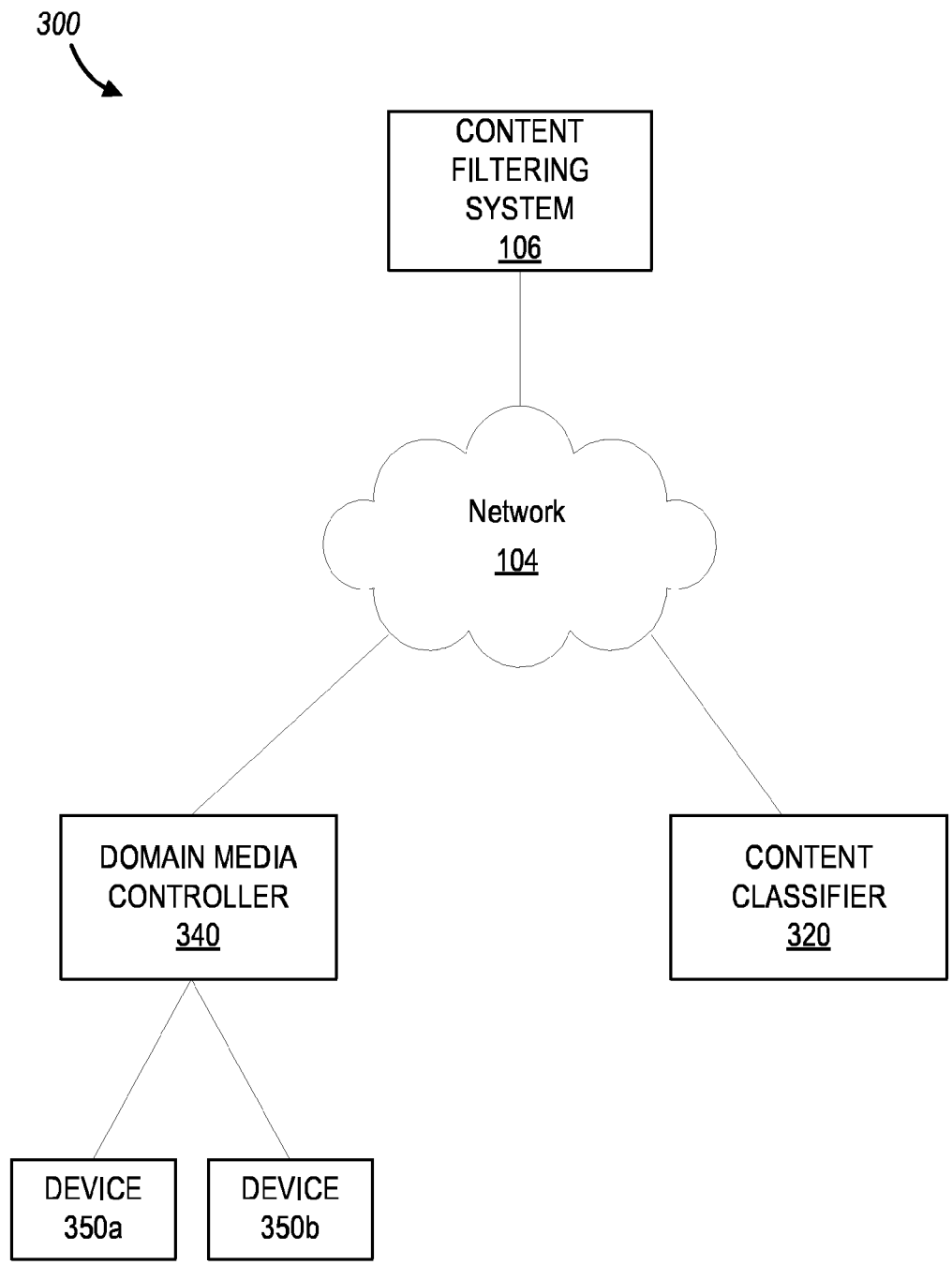
FIG. 3 is a schematic block diagram illustrating a content filtering system, according to an example embodiment.

FIG. 3 is a schematic block diagram illustrating a content filtering system 300, according to an example embodiment. In this example embodiment, the content filtering system 300 communicates with a remote domain media controller 340 and a remote content classifier 320.

In one embodiment, the domain media controller 340 provides one or more media content filter rules for use by the content filtering system 300. In another example embodiment, the content filtering system 300 transmits requested media content with an associated media content certificate, and the domain media controller 340 filters the media content in response to the media content violating any media filtering rules as described herein.

In one example embodiment, the domain media controller 340 submits a filter rule to the content filtering system 300 that text media that includes profanity is not allowed on the domain. In response to the device 350a, operating on the domain network, requesting text media that includes profanity, the content filtering system 300 (e.g. the filter module 290) filters the text media content. In one example, the filter module 290 denies the request for the media content. In another example, the filter module 290 transmits substitute text media content.

In another example embodiment, the domain media controller 340 submits a filter rule that forbids pornographic imagery. In response to the device 350b requesting an image where the associated media content certificate indicates pornographic material, the content filtering system 300 filters the image. In one example, the content filtering system 300 denies access to the image. In another example, the content filtering system 300 provides a substitute image. The substitute image may indicate why the requested image was filtered.

In another example embodiment, the classification module 240 requests content classification from a remote service. In certain examples, the classification module 240 requests classification of received media content using an application program interface (API) for a remote service such as, but not limited to, "Google Safe Browsing" by Google™, VirusTotal, ClaimAV, or other, or the like. In other embodiments, the remote content classifier 320 includes custom classification routines as one skilled in the art may appreciate. In one example, the remote content classifier 320 identifies a virus, a malicious uniform resource locator (URL), pornography, fake accounts, spam, or other potentially nefarious content.

In one example embodiment, the classification module 240 performs cursory classification of received media content, and forwards the media content to the content classifier 320 for comprehensive classification as previously described.

Figure 4:
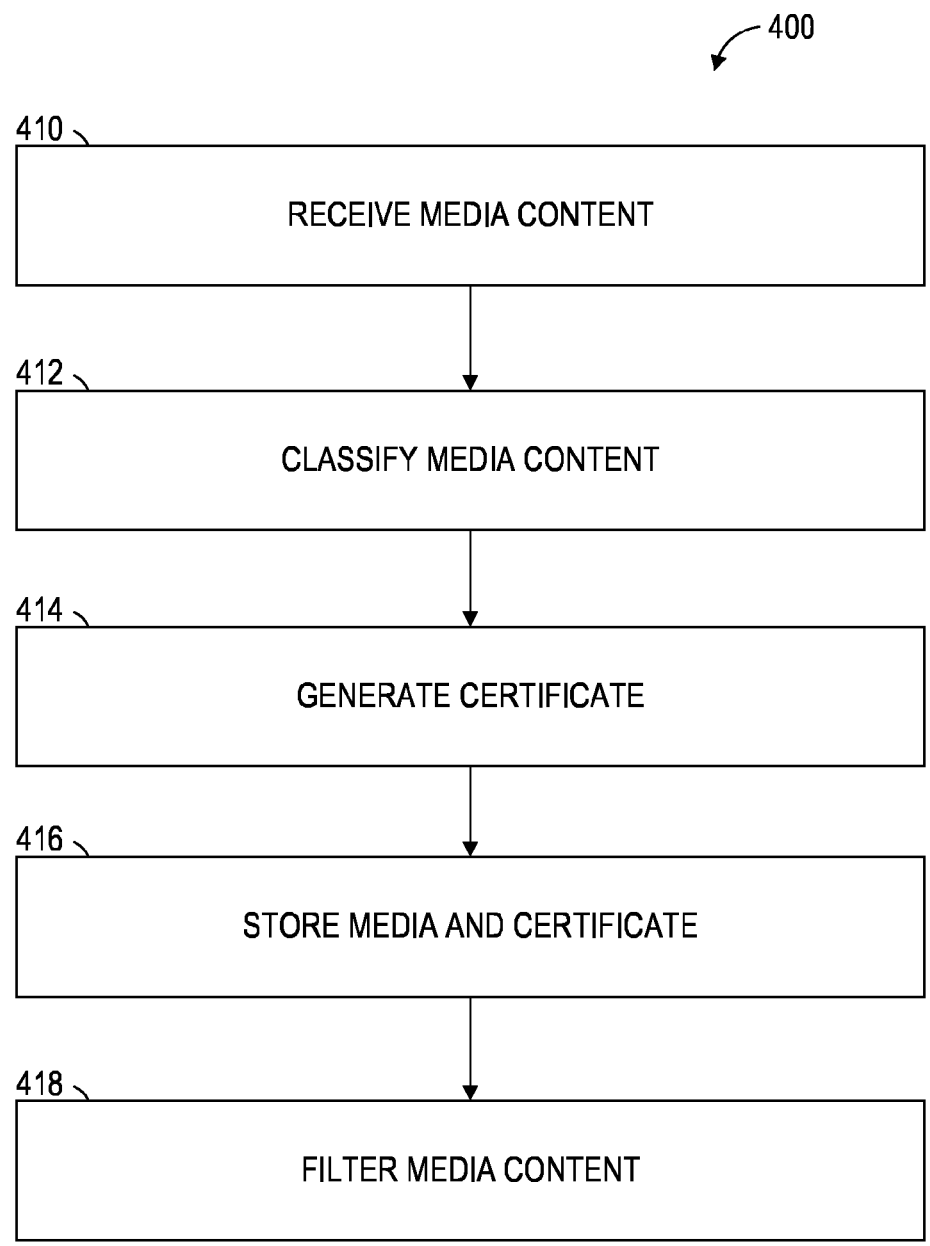
FIG. 4 is a flow chart diagram illustrating a method of managing distribution of media content, according to an example embodiment.

FIG. 4 is a flowchart diagram illustrating a method 400 of managing distribution of media content, according to an example embodiment. According to one example embodiment, operations in the method 400 may be performed by the content filtering system 106, using modules described above with respect to FIG. 2. As shown in FIG. 4, the method 400 includes operations 410, 412, 414, 416, and 418.

In one embodiment, the method 400 begins and at operation 410, the ingestion module 220 receives media content from a content submitter. The method 400 continues at operation 412 the classification module 240 classifies the media content by initiating one of synchronous classification and asynchronous classification based on a type of the media content.

The method 400 continues at operation 414, the certificate module 260 generates a media content certificate based on the media type, the certificate including results of the classification. The method 400 continues at operation 416 and the storage module 280 stores the media content certificate with the media content. The method 400 continues at operation 418 and the filter module 290 filters the media content based on the content of the media content certificate. In certain embodiments, the content of the media content certificate includes an identity of the content submitter, results of the classification, and/or other parameters that describe the media content as included herein.

In another example embodiment, the filter module 290 filters the media content in response to results of the classification indicating that the media content comprises at least one of a solicitation of employment, a promotion, an event, and an advertisement.

Figure 5:
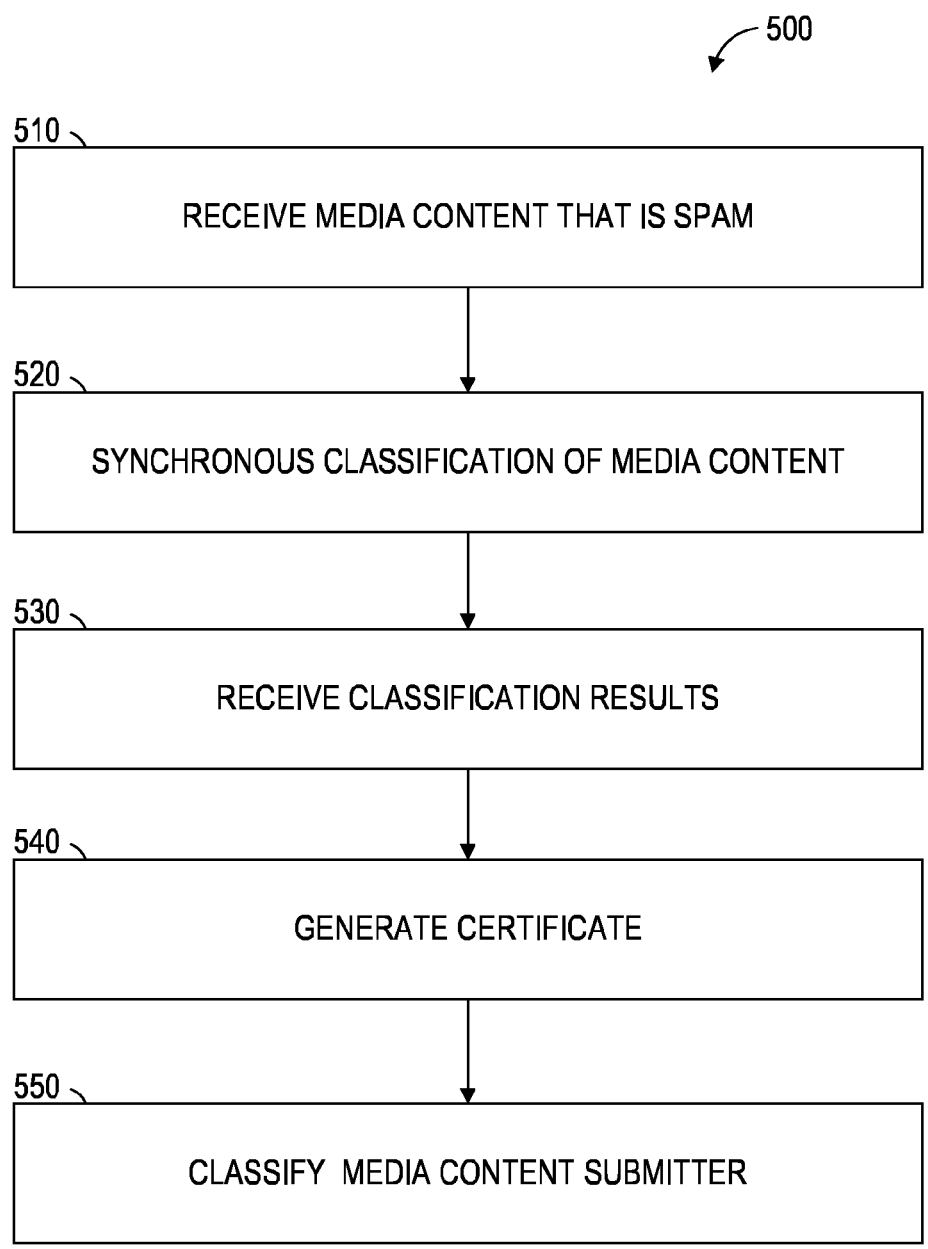
FIG. 5 is a flow chart diagram illustrating a method for classifying media content, according to one example embodiment.

FIG. 5 is a flow chart diagram illustrating a method for classifying media content, according to one example embodiment. According to one example embodiment, operations in the method 500 may be performed by the content filtering system 106, using modules described above with respect to FIG. 2. As shown in FIG. 5, the method 500 includes operations 510, 520, 530, 540, and 550.

In one example embodiment, the method 500 begins and at operation 510, the ingestion module 220 receives media content from a content submitter. The method 500 continues at operation 520 the classification module 240 performs synchronous classification of the media content. After synchronous classification of the media content, the certificate module 260 generates, at operation 540, a media content certificate based on the media type, the certificate including results of the classification. The method 500 continues at operation 550 and the classification module 240 further classifies the media content submitter as a spammer. In another example embodiment, the classification module 240 also reclassifies other media content submitted by the media content submitter as spam media content. In response to the classification module 240 reclassifying the media content, the certificate module 260 updates the parameters in the media content certificate for the media content. The certificate module 260 may overwrite parameters, replace parameters, add parameters, or include parameters in any other way as one skilled in the art may appreciate.

In other embodiments of the method 600, the predefined media types for synchronous classification include text strings and binary values, and the predefined media types for asynchronous classification include images, video, and audio.

Figure 6:
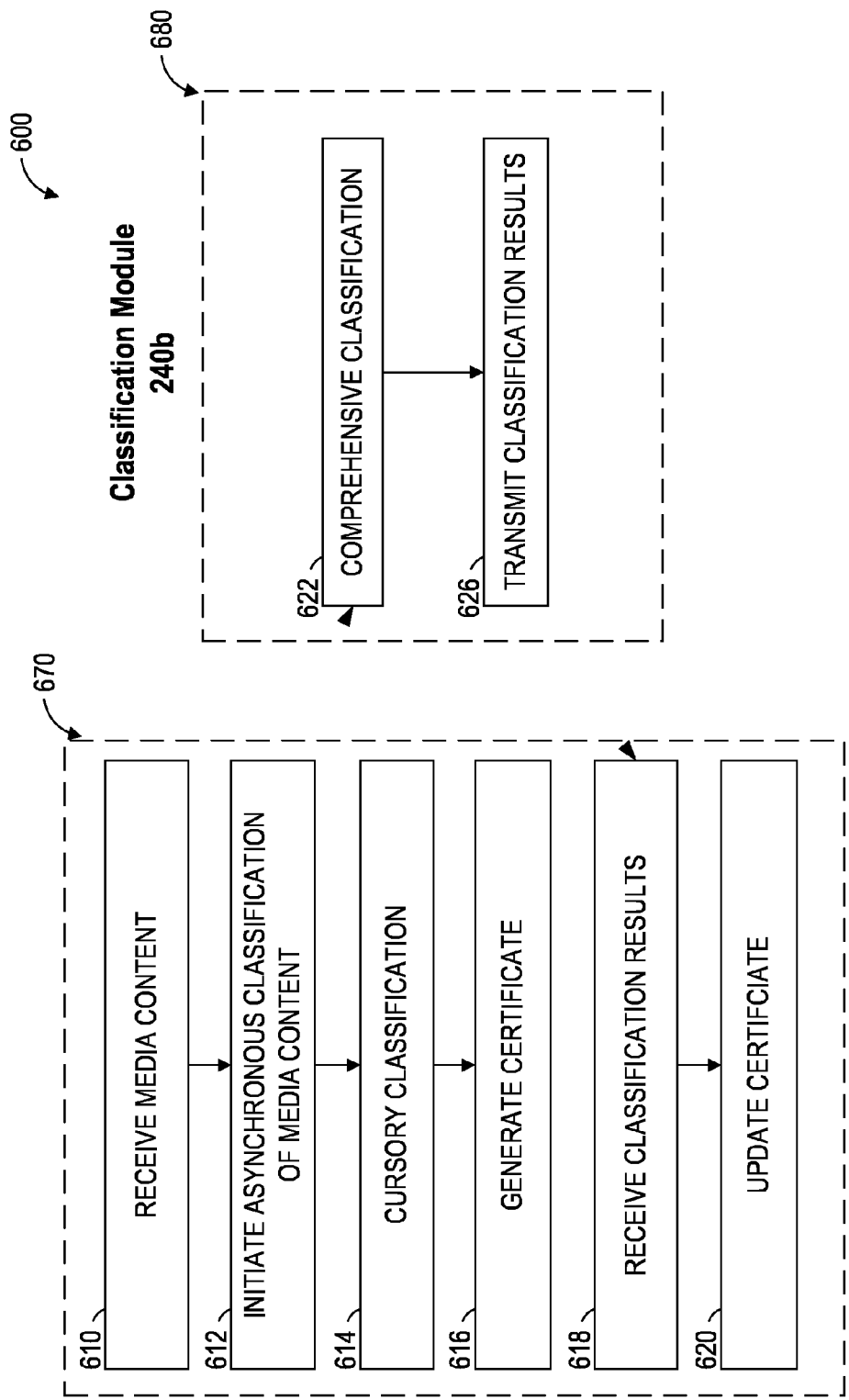
FIG. 6 is a flow chart diagram illustrating one method for managing distribution of media content, according to an example embodiment.

FIG. 6 is a flow chart diagram illustrating one method for managing distribution of media content, according to an example embodiment. According to one example embodiment, operations in the method 600 may be performed by the content filtering system 106, using modules described above with respect to FIG. 2. As shown in FIG. 6, the method 600 includes operations 610, 612, 614, 616, 618, 620, 622, 624, and 626.

According to this example embodiment 600, the first set 670 of operations 610, 612, 614, 616, 618, and 620 are performed by a first computing device, and a second set 680 of operations 622 and 626 are performed by a second computing device. In one embodiment, the first computing device and the second computing device are separate processors of a computing machine that includes several processors. A first instantiation of the classification module 240 may execute on the first computing device and a second instantiation of the classification module 240b may execute on the second computing device. Accordingly, in some examples, the classification module 240b operating on the second computing device may interact and/or transmit/receive data from the classification module 240 operating via the first computing device.

In one example embodiment, the method 600 begins and at operation 610, the ingestion module 220 receives media content from a content submitter. The method 600 continues at operation 612 and the classification module 240 requests asynchronous classification of the media content in response to the type of the submitted media content matching one of a set of predefined media types. In one example, the media type is video and the classification module 240 initiates asynchronous classification of the video.

The first computing device continues at operation 614 and the classification module 240 performs a cursory classification of the submitted media content. The method 600 continues at operation 616 and the certificate module 260 generates a media content certificate to include results of the classification, parameters that describe the media content, and the like as described herein.

In response to receiving an instruction to initiate asynchronous classification of the media content, the second computing device begins comprehensive classification of the media content at operation 622. The method 600 continues at operation 626 and the classification module 240b operating at the second computing device transmits results of the comprehensive classification to the classification module 240 operating at the first computing device.

The method 600 continues at operation 618 and the classification module 240 receives results of the comprehensive classification performed by the classification module 240b operating at the second computing device. The method 600 continues at operation 620 and the certificate module 260 updates the media content certificate based on the results of the comprehensive classification.

Figure 7:
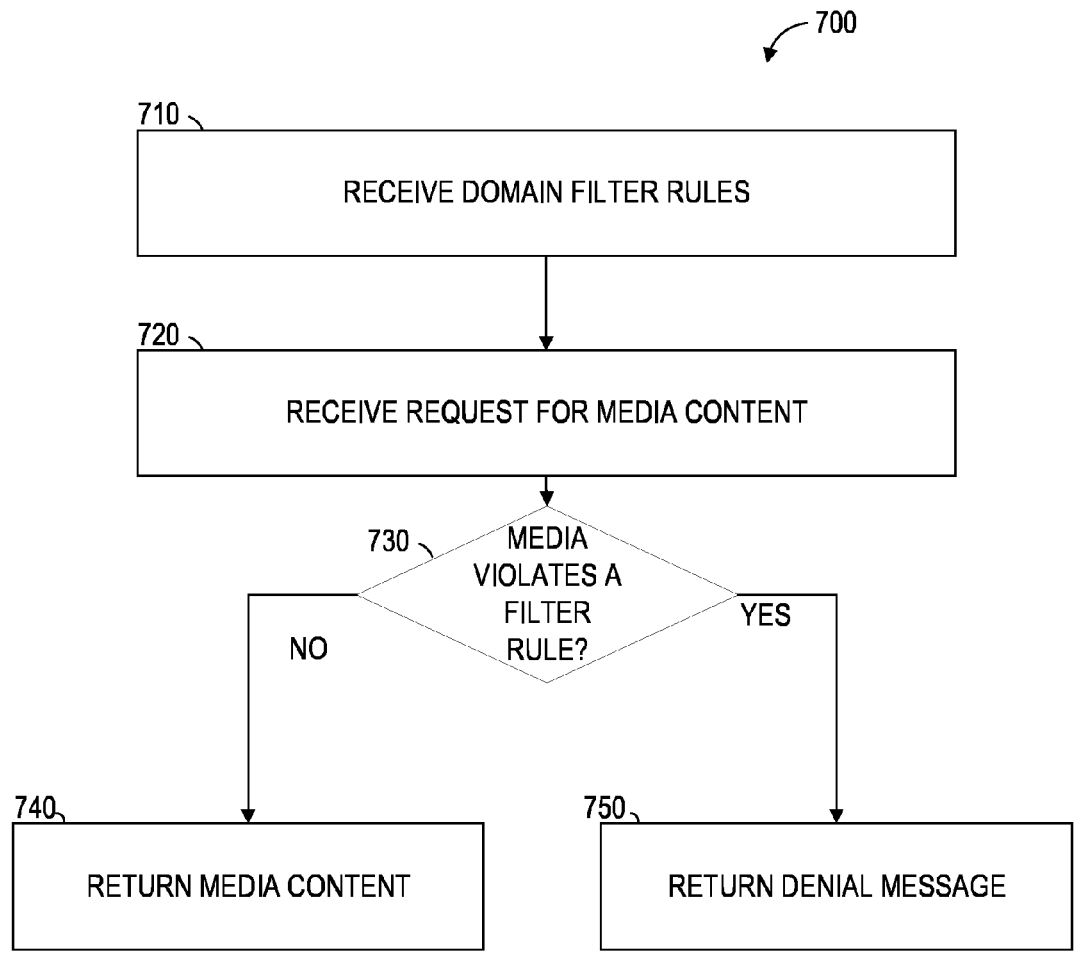
FIG. 7 is a flow chart diagram illustrating one method for filtering media content, according to one example embodiment.

FIG. 7 is a flow chart diagram illustrating one method 700 for filtering media content. According to one example embodiment, operations in the method 600 may be performed by the content filtering system 106, using modules described above with respect to FIG. 2. As shown in FIG. 7, the method 700 includes operations 710, 720, 730, 740, and 750.

The method 700 begins and at operation 710, the filter module 290 receives one or more domain filter rules. The method 700 continues at operation 720 and the filter module 290 receives a request for media content stored by the content filtering system 106. The method 730 continues at operation 730 and the filter module 290 determines whether the requested media content violates one or more of the domain filter rules.

In response to the media content not violating one or more of the domain filter rules, the method 700 continues at operation 740 and the filter module 290 returns the requested media content to the requester. In response to the media content violating one or more domain filter rules, the method 700 continues at operation 750 and the filter module 290 filters the requested media content.

Figure 8:
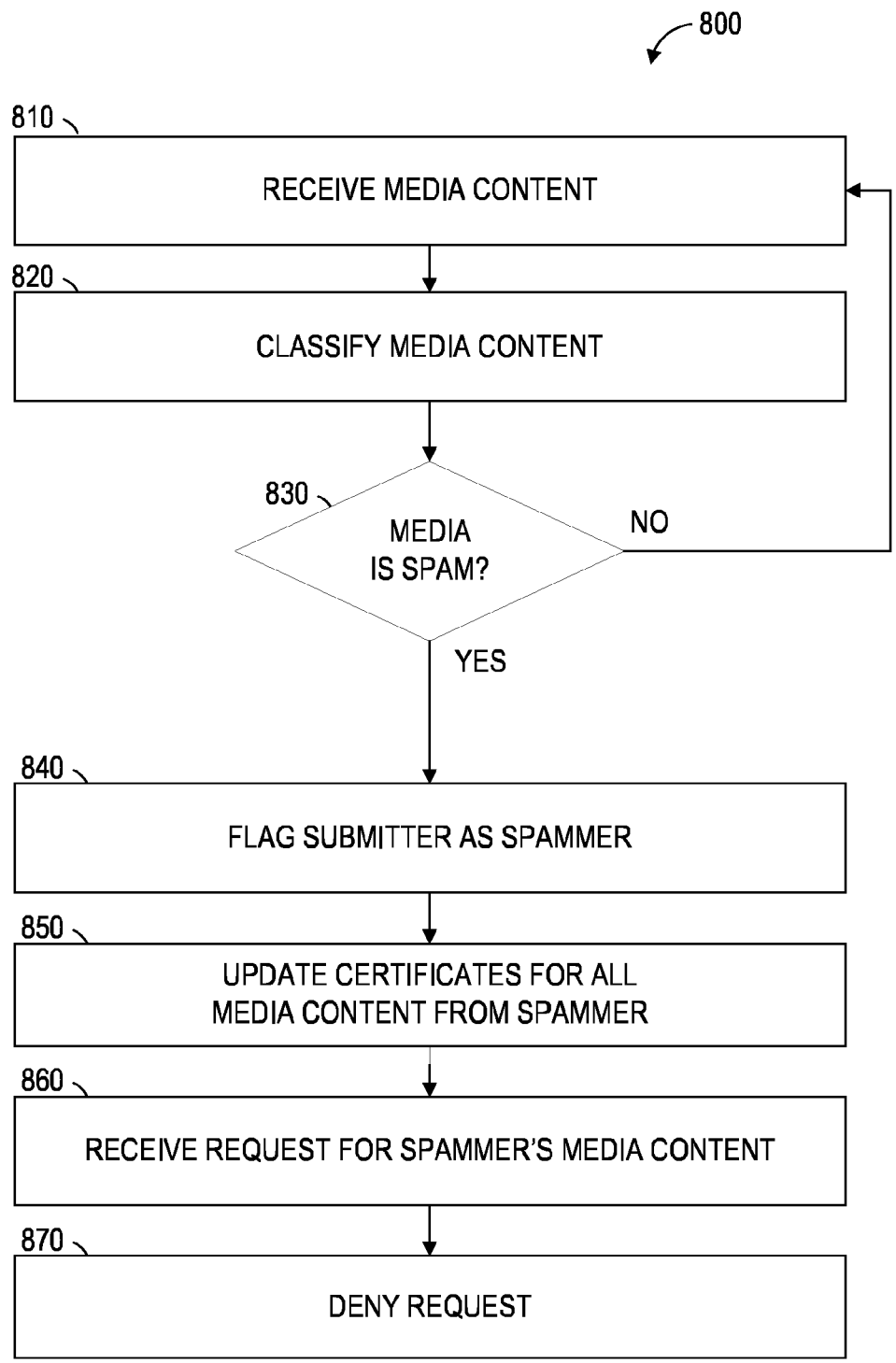
FIG. 8 is a flow chart diagram illustrating one method for identifying malicious media content, according to an example embodiment.

FIG. 8 is a flow chart diagram illustrating one method for identifying malicious media content, according to an example embodiment. According to one example embodiment, operations in the method 800 may be performed by the content filtering system 106, using modules described above with respect to FIG. 2. As shown in FIG. 8, the method 800 includes operations 810, 820, 830, 840, 850, 860, and 870.

In one embodiment, the method 800 begins and at operation 810, the ingestion module 220 receives media content from a content submitter. The method 800 continues at operation 820 the classification module 240 classifies the media content as descried herein. The method 800 continues at operation 830 and the classification module 240 determines whether the received media content is spam. In response to the received media content not being spam, the method 800 continues at operation 810. In response to the received media content being spam, the method 800 continues at operation 840 and the classification module 240 identifies the submitter of the media content as a spammer.

The method 800 continues at operation 850 and the certificate module 260 updates media content certificates for all other media content submitted by the spammer to indicate that the media content was submitted by the spammer. The method 800 continues at operation 860 and the filter module 290 receives a request for the submitted media content. The method 800 continues at operation 870 and the filter module 290 denies the request for the media content.

Figure 9:
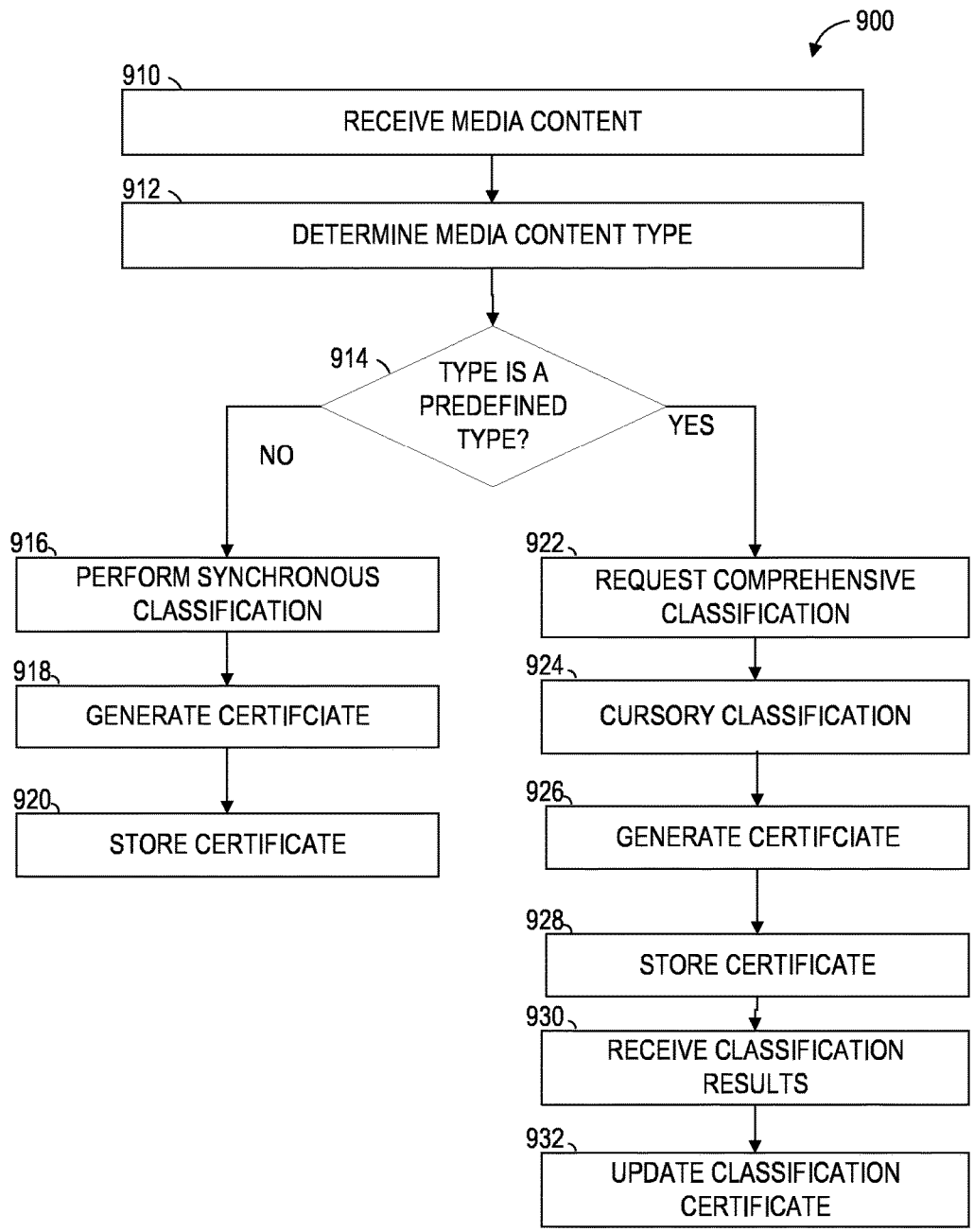
FIG. 9 is a flow chart diagram illustrating one method for classifying media content based on the media content type, according to one example embodiment.

FIG. 9 is a flow chart diagram illustrating one method for classifying media content based on the media content type, according to one example embodiment. According to one example embodiment, operations in the method 900 may be performed by the content filtering system 106, using modules described above with respect to FIG. 2. As shown in FIG. 9, the method 900 includes operations 910, 912, 914, 916, 918, 920, 922, 924, 926, 928, 930, and 932.

In one example embodiment, the method 900 begins and at operation 910, the ingestion module 220 receives media content from a content submitter. The method 900 continues at operation 912 the classification module 240 determines a media content type for the media content. The method 900 continues at operation 914 and the classification module 240 determines whether the type of the media content matches a set of predefined media types for asynchronous classification.

In response to the media type not being a pre-defined media type, the method 900 continues at operation 916 and the classification module 240 performs synchronous classification of the media content. The method 900 continues at operation 918 and the certificate module 260 generates a media content certificate that includes the various classification results such as, but not limited to, type indicators, parameters, or the like. The method 900 continues at operation 920 and the storage module 280 stores the media content certificate with the media content.

In response to the media type being one of a set of pre-defined media types, the method 900 continues at operation 922 and the classification module 240 requests comprehensive classification for the media content. While the comprehensive classification is being performed, the method 900 continues at operation 924 and the classification module 240, while waiting for results of the asynchronous classification, performs cursory classification on the media content as previously described. The method 900 continues at operation 926 and the certificate module 260 generates a media content certificate that includes results of the cursory classification.

The method 900 continues at operation 928 and the storage module 280 stores the media content with the media content certificate as described herein. After storing the media content with the media content certificate, the method 900 continues at operation 930 and the classification module 240 receives results of the comprehensive classification. The method 900 continues at operation 932 and the certificate module 260 updates the media content certificate with the results of the comprehensive classification.

Figure 10:
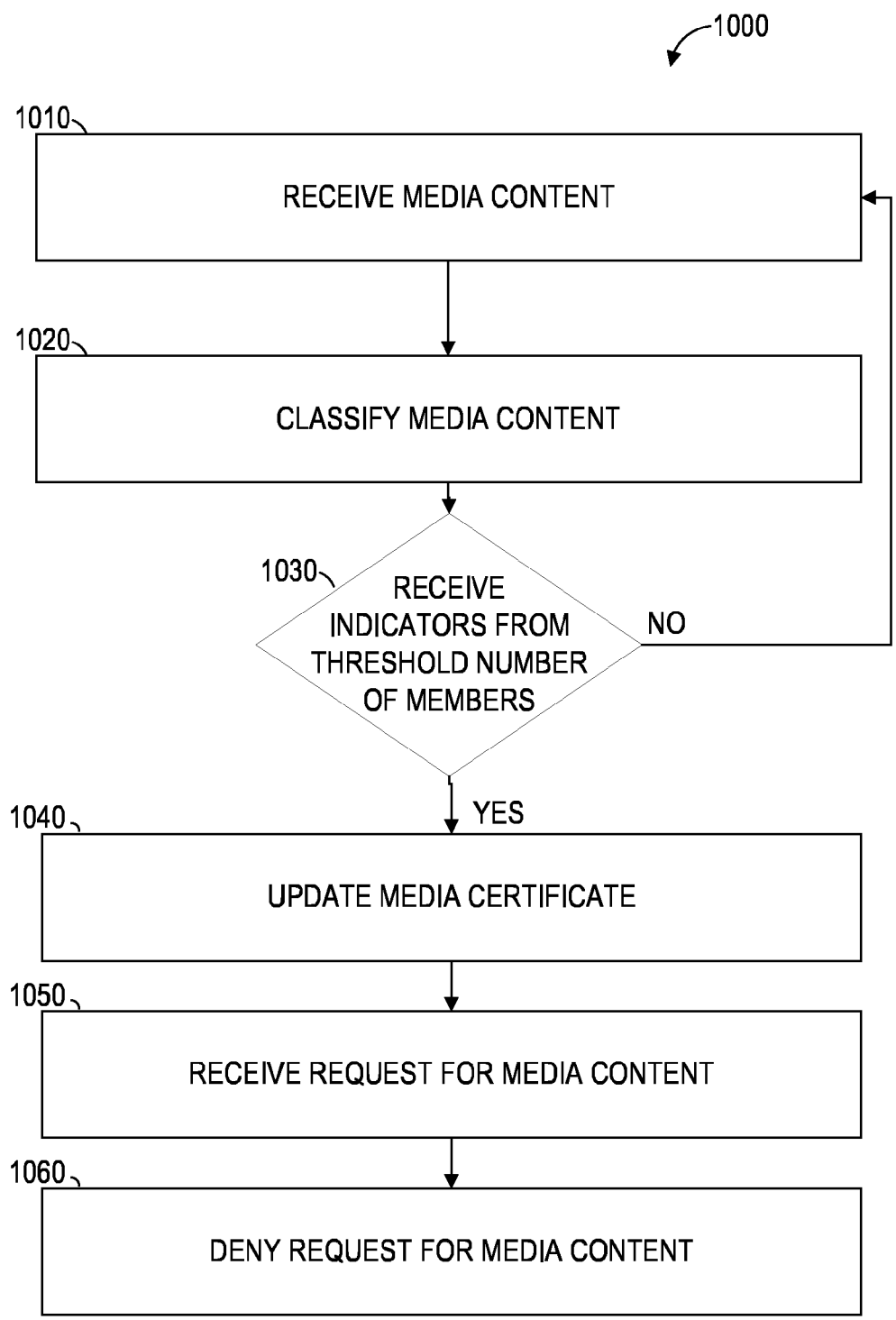
FIG. 10 is a flow chart diagram illustrating one method for managing distribution of media content, according to an example embodiment.

FIG. 10 is a flow chart diagram illustrating one method for managing distribution of media content, according to an example embodiment. According to one example embodiment, operations in the method 1000 may be performed by the content filtering system 106, using modules described above with respect to FIG. 2. As shown in FIG. 10, the method 1000 includes operations 1010, 1020, 1030, 1040, 1050, and 1060.

In one embodiment, the method 1000 begins and at operation 1010, the ingestion module 220 receives media content from a content submitter. The method 1000 continues at operation 1020 the classification module 240 classifies the media content by initiating one of synchronous classification and asynchronous classification based on a type of the media content. The method 1000 continues at operation 1030 and the filter module 290 determines whether a threshold number of members have indicated that the media content is inappropriate.

In response to the number of members indicating that the media content is inappropriate not being above the threshold value, the method 1000 continues at operation 1010. In response to the number of members indicating that the media content is inappropriate exceeding a threshold value, the method 1000 continues at operation 1040 and the certificate module 260 updates the media content certificate to indicate that the media content is inappropriate. In other embodiments, the indicators from the members indicate that the media content is pornography, contains vulgar language, includes malicious content, includes an advertisement, includes an employment opportunity, or the like.

The method 900 continues at operation 1050 and the filter module 290 receives a request for the media content. The method 900 continues at operation 1060 and the filter module 290 denies the request for the media content.

Figure 11:
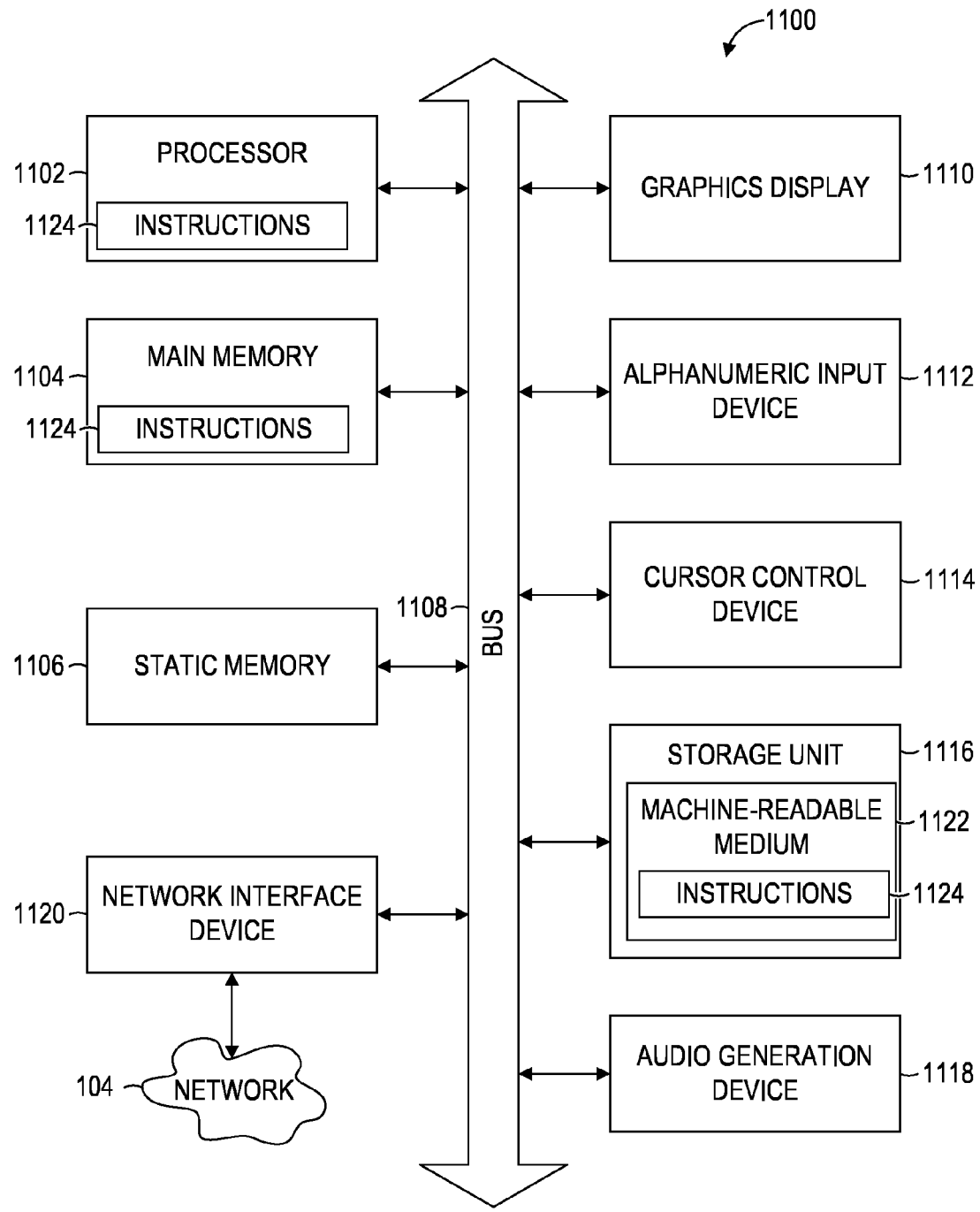
FIG. 11 is a block diagram illustrating components of a machine able to read instructions from a machine-readable medium.

FIG. 11 is a block diagram illustrating components of a machine able to read instructions from a machine-readable medium. Specifically, FIG. 11 shows a diagrammatic representation of the machine 1100 in the example form of a computer system and within which instructions 1124 (e.g., software) for causing the machine 1100 to perform any one or more of the methodologies discussed herein may be executed. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include a collection of machines that individually or jointly execute the instructions 1124 to perform any one or more of the methodologies discussed herein. In certain embodiments, the various modules described in FIG. 2 are implemented as part of the instructions 1124.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a graphics display 1110 (e.g., a plasma display panel (PDP), a light emitting diode (LED) display, a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 on which is stored the instructions 1124 (e.g., software) embodying any one or more of the methodologies or functions described herein. The instructions 1124 may also reside, completely or at least partially, within the main memory 1104, within the processor 1102 (e.g., within the processor's cache memory), or both, during execution thereof by the machine 1100. Accordingly, the main memory 1104 and the processor 1102 may be considered as machine-readable media. The instructions 1124 may be transmitted or received over a network 104 via the network interface device 1120.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1100), such that the instructions, when executed by one or more processors of the machine (e.g., processor 1102), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
a processor; and
a machine-readable medium coupled to the processor, the machine readable medium having instructions stored thereon, which, when executed by the processor, cause the system to receive media content from a content submitter;
classify the media content by initiating one of synchronous classification and asynchronous classification based on a media type of the media content;
generate a media content certificate based on the media type, the certificate including results of the classification;
store the media content certificate with the media content; and
filter the media content based on at least one of an identity of the content submitter, the results of the classification, and the media content including malicious content.

2. The system of claim 1, wherein the filtering comprises receiving domain filter rules associated with a domain, filtering the media content in response to the media content being requested from the domain and based on the domain filter rules, the domain filter rules comprising at least one of a specific user rule, an image filter rule, a term filter rule, a manual filter rule, and a location filter rule.

3. The system of claim 1, wherein the filtering comprises filtering the media content in response to results of the classification indicating that the media content comprises at least one of a solicitation of employment, a promotion, an event, and an advertisement.

4. The system of claim 1, wherein classifying the media content comprises initiating the synchronous classification in response to the media type being one of a set of predefined media types for synchronous classification and initiating asynchronous classification of the media content in response to the media type being one of a set of predefined types for asynchronous classification.

5. The system of claim 4, wherein the predefined media types for synchronous classification include text strings and binary values, and the predefined media types for asynchronous classification include images, video, and audio.

6. The system of claim 1, wherein the filtering is based on the identity of the content submitter.

7. The system of claim 6, wherein the classification comprises identifying the content submitter as a spammer based on the content submitter submitting content classified as spam, the filtering comprises filtering all media content from the content submitter.

8. The system of claim 6, wherein the filtering comprises filtering the media content in response to a requester for the media content having blocked the content submitter.

9. The system of claim 6, wherein the filtering comprises filtering the media content in response to a threshold number of users indicating that the media content is inappropriate.

10. The system of claim 1, wherein the media content certificate indicates at least one of a media content type, an occupational opportunity, a promotion, a subject matter, a predefined term, malicious executable code, a media content rating, spam, a submitter, and a submitter rating.

11. A computer-implemented method comprising:
receiving media content from a content submitter;
classifying the media content by initiating one of synchronous classification and asynchronous classification based on a type of the media content;
generating a media content certificate based on the media type, the certificate including results of the classification;
storing the media content certificate with the media content; and
filtering the media content based on at least one of an identity of the content submitter, the results of the classification, and the media content including malicious content.

12. The computer-implemented method of claim 11, further comprising receiving domain filter rules, the filter module further filtering the media content in response to the media content being requested from the domain and based on the domain filter rules, the domain filter rules comprising at least one of a specific user rule, an image filter rule, a term filter rule, a manual filter rule, and a location filter rule.

13. The computer-implemented method of claim 11, wherein the filtering comprises filtering the media content in response to results of the classification indicating that the media content comprises at least one of a solicitation of employment, a promotion, an event, and an advertisement.

14. The computer-implemented method of claim 11, wherein classifying the media content comprises initiating synchronous classification in response to the media type being one of a set of predefined media types for synchronous classification and initiating asynchronous classification of the media content in response to the media type being one of a set of predefined types for asynchronous classification.

15. The computer-implemented method of claim 14, wherein the predefined media types for synchronous classification include text strings and binary values, and the predefined media. types for asynchronous classification include images, video, and audio.

16. The computer-implemented method of claim 11, wherein the filtering is further based on an identity of the content submitter.

17. The computer-implemented method of claim 16, further comprising identifying the content submitter as a spammer based on the content submitter submitting content classified as spam, the filtering further comprises filtering all media content from the content submitter.

18. The computer-implemented method of claim 16, wherein the filtering is in response to a requester for the media content having blocked the content submitter.

19. The computer-implemented method of claim 16, wherein the filtering is in response to a threshold number of users indicating that the media content is inappropriate.

20. A non-transitory machine-readable medium having instructions stored thereon, which, when executed by a processor, cause operations to be performed, the operations comprising:
receiving media content from a content submitter;
classifying the media content by initiating one of synchronous classification and asynchronous classification based on a media type of the media content;
generating a media content certificate based on the media type, the certificate including results of the classification;

storing the media content certificate with the media content; and filtering the media content based on at least one of an identity of the content submitter, the results of the classification, and the media content including malicious content.

\* \* \* \* \*

UNITED STATES PATENT AND TRADEMARK OFFICE
CERTIFICATE OF CORRECTION

PATENT NO. : 10,044,655 B2
APPLICATION NO. : 14/926651
DATED : August 7, 2018
INVENTOR(S) : Martell et al.

Page 1 of 1

It is certified that error appears in the above-identified patent and that said Letters Patent is hereby corrected as shown below:

In the Claims

In Column 20, Line 41, in Claim 15, after "media", delete ".".

Signed and Sealed this
Twentieth Day of August, 2019

Andrei Iancu
*Director of the United States Patent and Trademark Office*